C. A. PARSONS, S. S. COOK AND L. M. DOUGLAS.
CARBON GLAND.
APPLICATION FILED JULY 19, 1919.
1,331,362. Patented Feb. 17, 1920.
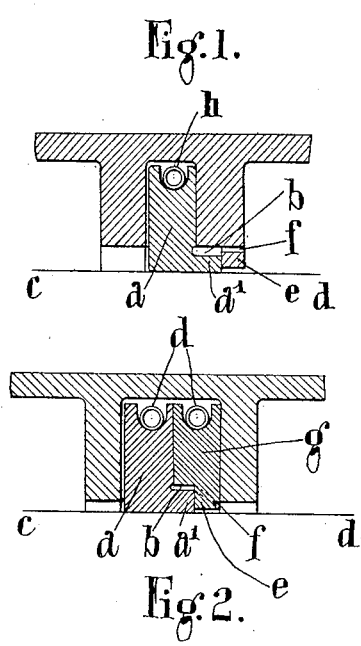

UNITED STATES PATENT OFFICE.

CHARLES ALGERNON PARSONS, STANLEY SMITH COOK, AND LOUIS MORTIMER DOUGLAS, OF NEWCASTLE-UPON-TYNE, ENGLAND; SAID COOK AND SAID DOUGLAS ASSIGNORS TO SAID PARSONS.

CARBON GLAND.

1,331,362.      Specification of Letters Patent.      Patented Feb. 17, 1920.

Original application filed October 5, 1918, Serial No. 257,080. Divided and this application filed July 19, 1919. Serial No. 312,055.

*To all whom it may concern:*

Be it known that we, CHARLES ALGERNON PARSONS, K. C. B., STANLEY SMITH COOK, and LOUIS MORTIMER DOUGLAS, all subjects of the King of Great Britain and Ireland, and all residing at Heaton Works, Newcastle-upon-Tyne, in the county of Northumberland, England, have invented certain new and useful Improvements in Carbon Glands, of which the following is a specification.

This invention relates to carbon glands for packing rotating shafts and has for its object to produce a carbon gland-ring capable of sustaining higher pressures than have been hitherto carried and having greatly reduced friction while being more reliable than has hitherto been the case with such gland-rings.

The invention is more particularly concerned with the type of gland-ring described in our co-pending application No. 257080 from which this is a divisional application.

Carbon glands as heretofore designed consist of rings, each ring being made up of sectors of graphitic carbon usually of rectangular cross section, embracing the rotating shafts and held together by a spring encircling them, the purpose of such carbon gland-ring being to baffle the flow of steam from a higher pressure on one side of it to a lower pressure on the other. The outer periphery of the gland-ring is in such case subjected over its whole area to the higher pressure, while its inner periphery, which is in contact with or is bored to fit the surface of the shaft, is subject to a lower average pressure owing to the fall of pressure from the high pressure side to the low pressure side. It follows, therefore, that there is a radial inward force on the ring pressing it toward the shaft, thus giving rise to friction, absorbing power and producing a corresponding amount of heat.

The present invention consists broadly in constructing gland-rings in such a manner that they are substantially in radial equilibrium under the steam pressure.

The invention further consists in forming the gland-rings of L shape with the extension along the shaft toward the low pressure side, a space being provided between the back of the extended portion and the housing of the gland-ring, which space is exposed to the lower pressure.

The invention also consists in an internal projection so disposed that the end of the extension of the gland ring bears against it in order to prevent tilting of the segments.

The invention still further consists in constructing the internal projection as a second carbon or like ring placed in the same groove of the housing as the gland ring itself.

The invention also consists in the improved carbon glands hereinafter described.

In carrying the invention into effect according to the example illustrated in Fig. 1, the gland is made up of a number of L shaped segments $a$ with extensions $a'$ lying along the shaft toward the low pressure side. A space $b$ is allowed between the housing of the gland and the back of the extended portion of each carbon sector, and this space is exposed to the low pressure. In this manner while retaining the same width of ring (in an axial direction) as would normally exist in an ordinary ring of rectangular section the inward pressure of the steam on the gland-ring may be made substantially equal to the outward pressure, there being high pressure over the periphery of the gland-ring on the high pressure side and low pressure over the back of the extension on the low pressure side, these two pressures acting against the outward radial pressure which varies along the shaft from the higher to the lower value. The rotating shaft is shown at $c\ d$, and $c$ is the high pressure and $d$ the low pressure end.

The housing may be provided with a projection $e$ bearing against the end of the extension $a'$, the gland-ring thus fitting closely against the housing in two planes perpendicular to the axis of the shaft. An aperture $f$ is provided in the projection $e$ against which the end of the extension bears to allow the access of low pressure steam to the space $b$ at the back of the extension.

Fig. 2 is a modification of Fig. 1 in which a second carbon ring $g$ is employed as a support for the balanced ring $a$. This second ring, as will be seen, is bored out clear of the shaft. Owing to the low thermal expansion of carbon relatively to the metal of the gland housing, this method gives an advantage over that shown in Fig. 1, because of the constancy of the fit of the adjacent transverse faces under varying temperatures.

By means of the invention the rings are substantially in equilibrium in the radial direction under the steam pressure so that friction against the shaft is reduced and higher steam pressures across the gland-rings can be allowed.

In consequence of the reduced friction and reduced heating a more reliable gland is obtained.

It is usually preferable to leave a slight balance of pressure in the inward radial direction to assist the encircling spring $h$ in keeping the carbon sectors in place. This spring may be placed either around the outer periphery of the ring or around the periphery of the extended portion of the ring.

The use of an encircling spring is not essential as the carbon rings may be held together by any other suitable means.

Having now described our invention, what we claim as new and desire to secure by Letters Patent is:—

1. In carbon and like glands for rotating shafts comprising packing rings divided into segments each with an extension projecting toward the low pressure end of the shaft, an internal projection so disposed that the end of the extension of the gland ring bears against it in order to prevent tilting of the segments.

2. In carbon and like glands as set forth in claim 1 a supplementary carbon or like ring to form the internal projection against which the gland ring bears.

In testimony whereof we have signed our names to this specification.

CHARLES ALGERNON PARSONS.
STANLEY SMITH COOK.
LOUIS MORTIMER DOUGLAS.